(12) United States Patent
Caruso et al.

(10) Patent No.: US 10,006,436 B2
(45) Date of Patent: Jun. 26, 2018

(54) WIND TURBINE ROTOR BLADES WITH LOAD-TRANSFERRING EXTERIOR PANELS

(71) Applicant: General Electric Company, Schenectady, NY (US)

(72) Inventors: Christopher Daniel Caruso, Greenville, SC (US); Edward McBeth Stewart, Greenville, SC (US); Aaron Alpheus Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 14/574,523

(22) Filed: Dec. 18, 2014

(65) Prior Publication Data

US 2016/0177917 A1    Jun. 23, 2016

(51) Int. Cl.
| | |
|---|---|
| *F03D 1/06* | (2006.01) |
| *F03D 1/00* | (2006.01) |
| *F03D 13/10* | (2016.01) |

(52) U.S. Cl.
CPC .......... *F03D 1/0675* (2013.01); *F03D 13/10* (2016.05); *Y02E 10/721* (2013.01)

(58) Field of Classification Search
CPC .... F03D 1/0675; F03D 1/0633; F03D 1/0641; F03D 1/683; Y02E 10/721
See application file for complete search history.

(56) References Cited

U.S. PATENT DOCUMENTS

| | | | | |
|---|---|---|---|---|
| 2,716,460 | A * | 8/1955 | Young | B64C 27/46 |
| | | | | 244/214 |
| 3,528,753 | A * | 9/1970 | Dutton | B64C 27/473 |
| | | | | 244/123.9 |
| 4,355,956 | A * | 10/1982 | Ringrose | F03D 3/067 |
| | | | | 416/119 |
| 7,854,594 | B2 * | 12/2010 | Judge | B29C 66/124 |
| | | | | 416/226 |
| 7,891,950 | B2 | 2/2011 | Baker et al. | |
| 8,328,516 | B2 | 12/2012 | Santiago et al. | |
| 8,475,133 | B2 | 7/2013 | Baker et al. | |
| 2007/0253824 | A1 | 11/2007 | Eyb | |
| 2012/0082555 | A1 | 4/2012 | Baker et al. | |

FOREIGN PATENT DOCUMENTS

WO      2011149990 A2    12/2011

* cited by examiner

*Primary Examiner* — Woody Lee, Jr.
*Assistant Examiner* — Brian O Peters
(74) *Attorney, Agent, or Firm* — Ernest G. Cusick; Frank A. Landgraff

(57) ABSTRACT

Rotor blades for a wind turbines include a structural support member disposed internal the rotor blade that extends for at least a portion of a rotor blade span length and an airfoil structure supported by the structural support member, the airfoil structure comprising a shell portion and at least one load-transferring exterior panel. The shell portion and the at least one load-transferring exterior panel combine to form an aerodynamic profile comprising a leading edge opposite a trailing edge and a pressure side opposite a suction side. Moreover, the shell portion and the at least one load-transferring exterior panel are independently connected to the structural support member.

19 Claims, 6 Drawing Sheets

WIND TURBINE ROTOR BLADES WITH LOAD-TRANSFERRING EXTERIOR PANELS

STATEMENT REGARDING FEDERALLY SPONSORED RESEARCH & DEVELOPMENT

This invention was partially made with government support under government contract No. DE-AR0000293 awarded by the Department of Energy. The government has certain rights to this invention.

BACKGROUND OF THE INVENTION

The subject matter disclosed herein relates to wind turbine rotor blades and, more specifically, to wind turbine rotor blades with load transferring exterior panels.

Wind power is considered one of the cleanest, most environmentally friendly energy sources presently available, and wind turbines have gained increased attention in this regard. A modern wind turbine typically includes a tower, generator, gearbox, nacelle, and one or more rotor blades connected to a hub either directly or through a pitch bearing. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades in general are increasing in size, in order to become capable of capturing increased kinetic energy. However, the weight of the rotor blade may become a factor as its size continues to increase. While multiple different extensions, features or other variants may be utilized to alter the aerodynamic profile of a rotor blade, each of these additional components may also contribute to the overall weight of the rotor blade. Moreover, these components must be connected to the rotor blade in a secure and sustainable manner.

Accordingly, alternative wind turbine rotor blades with load-transferring exterior panels would be welcome in the art.

BRIEF DESCRIPTION OF THE INVENTION

In one embodiment, a rotor blade for a wind turbine is disclosed. The rotor blade includes a structural support member disposed internal the rotor blade that extends for at least a portion of a rotor blade span length and an airfoil structure supported by the structural support member, the airfoil structure comprising a shell portion and at least one load-transferring exterior panel. The shell portion and the at least one load-transferring exterior panel combine to form an aerodynamic profile comprising a leading edge opposite a trailing edge and a pressure side opposite a suction side. Moreover, the shell portion and the at least one load-transferring exterior panel are independently connected to the structural support member.

In another embodiment, another rotor blade for a wind turbine is disclosed. The rotor blade includes a structural support member disposed internal the rotor blade that extends for at least a portion of a rotor blade span length, and an airfoil structure supported by the structural support member, the airfoil structure comprising a plurality of load-transferring exterior panels. The plurality of load-transferring exterior panels combine to form an aerodynamic profile comprising a leading edge opposite a trailing edge and a pressure side opposite a suction side. Moreover, each of the plurality of load-transferring exterior panels is independently connected to the structural support member.

In yet another embodiment, a method for assembly a rotor blade for a wind turbine is disclosed. The method includes providing a structural support member and connecting a plurality of load-transferring exterior panels to the structural support member to form an airfoil structure supported by the structural support member. The structural support member extends internal the airfoil structure for at least a portion of a rotor blade span length and each of the plurality of load-transferring exterior panels are independently connected to the structural support member. Moreover, the plurality of load-transferring exterior panels combine to form an aerodynamic profile comprising a leading edge opposite a trailing edge and a pressure side opposite a suction side.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
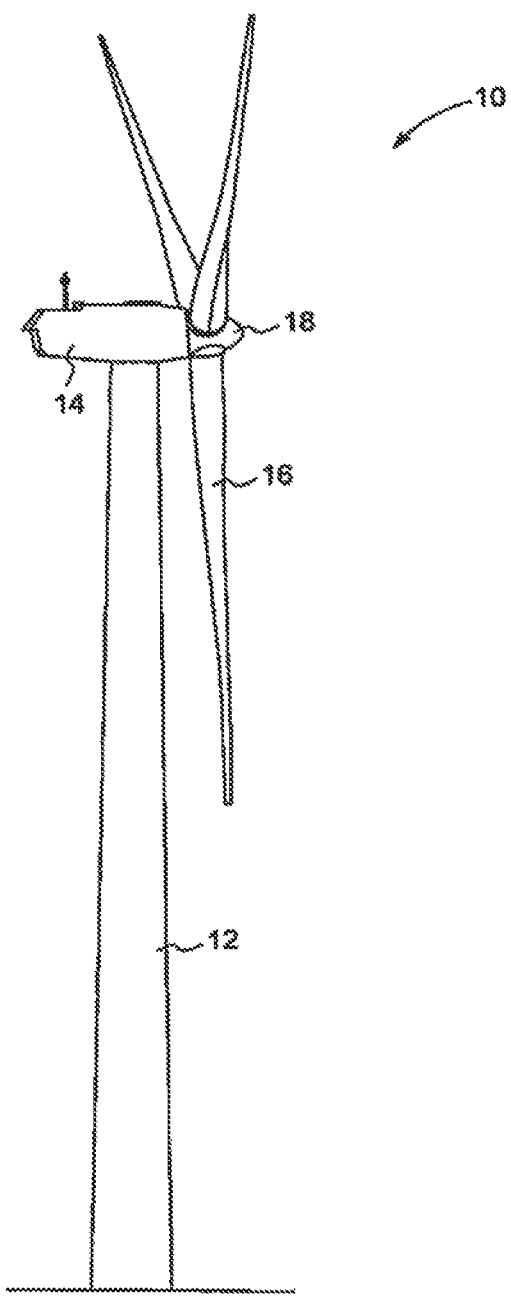
FIG. 1 is a perspective view of a conventional wind turbine having one or more rotor blades that may incorporate an aerodynamic root adapter according to one or more embodiments shown or described.

Referring now to FIG. 1 a wind turbine 10 of conventional construction is illustrated. The wind turbine 10 includes a tower 12 with a nacelle 14 mounted thereon. A plurality of rotor blades 16 are mounted to a rotor hub 18, which is in turn connected to a main flange that turns a main rotor shaft. Depending on the configuration of the wind turbine 10, the plurality of rotor blades 16 can, for example, be mounted to the rotor hub 18 indirectly through a pitch bearing (not illustrated) or any other operable connection technique. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
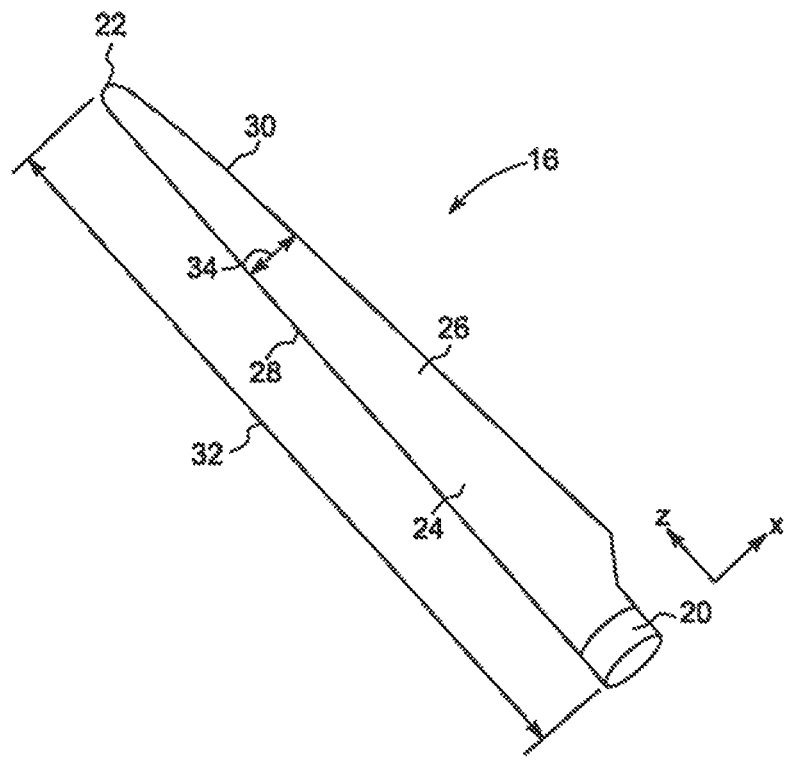
FIG. 2 is a perspective view of a rotor blade of the wind turbine illustrated in FIG. 1 according to one or more embodiments shown or described herein.

Referring now to FIG. 2, a perspective view of a rotor blade 16 is illustrated. The rotor blade 16 can include a root end 20 for mounting the rotor blade 16 to a mounting flange (not illustrated) of the wind turbine hub 18 (illustrated in FIG. 1) and a tip end 22 disposed opposite to the root end 20. The rotor blade 16 may comprise a pressure side 24 and a suction side 26 extending between a leading edge 28 and a trailing edge 30. In addition, the rotor blade 16 may include a span 32 defining the total length between the root end 20 and the tip end 22. The rotor blade 16 can further comprise a chord 34 defining the total length between the leading edge 28 and the trailing edge 30. It should be appreciated that the chord 34 may vary in length with respect to the span 32 as the rotor blade 16 extends from the root end 20 to the tip end 22.

The rotor blade 16 may define any suitable aerodynamic profile. Thus, in some embodiments, the rotor blade 16 may define an airfoil shaped cross-section. For example, the rotor blade 16 may also be aeroelastically tailored. Aeroelastic tailoring of the rotor blade 16 may entail bending the blade 16 in generally a chordwise direction x and/or in a generally spanwise direction z. As illustrated, the chordwise direction x generally corresponds to a direction parallel to the chord 34 defined between the leading edge 28 and the trailing edge 30 of the rotor blade 16. Additionally, the spanwise direction z generally corresponds to a direction parallel to the span 32 of the rotor blade 16. In some embodiments, aeroelastic tailoring of the rotor blade 16 may additionally or alternatively comprise twisting the rotor blade 16, such as by twisting the rotor blade 16 in generally the chordwise direction x and/or the spanwise direction z.

Figure 3:
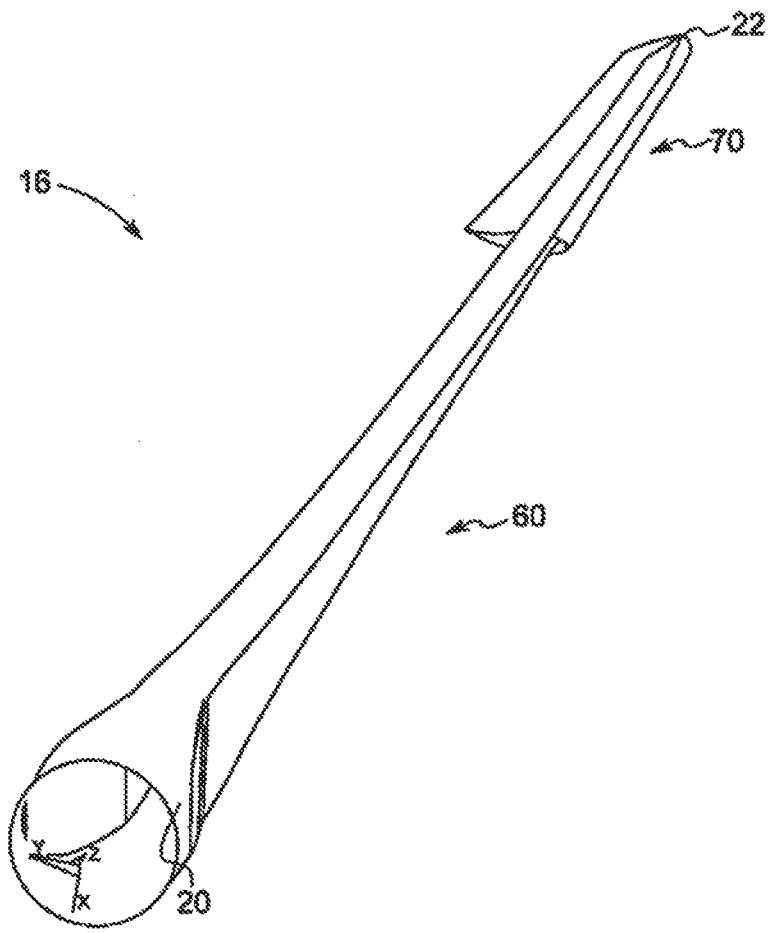
FIG. 3 is a structural support member and shell portion of a rotor blade according to one or more embodiments shown or described herein.

Referring now to FIG. 3, the rotor blade 16 generally comprises a structural support member 60 and an airfoil structure 50. The structural support member 60 is disposed internal the rotor blade 16 and extends for a least a portion of the rotor blade 16 span length 32 (i.e., in the spanwise direction z). The structural support member 60 can comprise any supportive member that is directly or indirectly connected to and supporting the airfoil structure 50 as will become appreciated herein and may comprise one or more different materials.

For example, in some embodiments, the structural support member 60 can comprise a fiberglass material. In such embodiments, the structural support member 60 can comprise at least one shear web connected to at least one spar cap. For example, the structural support member 60 may comprise two spar caps connected by a shear web such as in an I-beam configuration, or may comprise two spar caps connected by two shear webs such as in a box-configuration. The shear web and the spar cap may extend for any length of the rotor blade 16 span length 32 from the root end 20 to the tip end 22. In some embodiments, the shear web and the spar cap may extend for different lengths independent of one another. Moreover, while embodiments comprising the shear web and the spar cap have been presented herein, it should be appreciated that other embodiments may also be provided for structural support members 60 comprising fiberglass such as comprising only one of these elements and/or comprising additional elements not already described herein.

In some embodiments, the structural support member 60 can comprise a carbon fiber material. In such embodiments, the structural support member 60 may comprise a single spar body (i.e., without separate spar cap and shear web elements) that comprises the carbon fiber material, such as in a box configuration. While embodiments comprising the single spar body have been presented herein, it should be appreciated that other embodiments may also be provided for structural support members 60 comprising carbon fiber such as comprising an upper spar cap, a lower spar cap and/or additional elements not already described herein.

Figure 6:
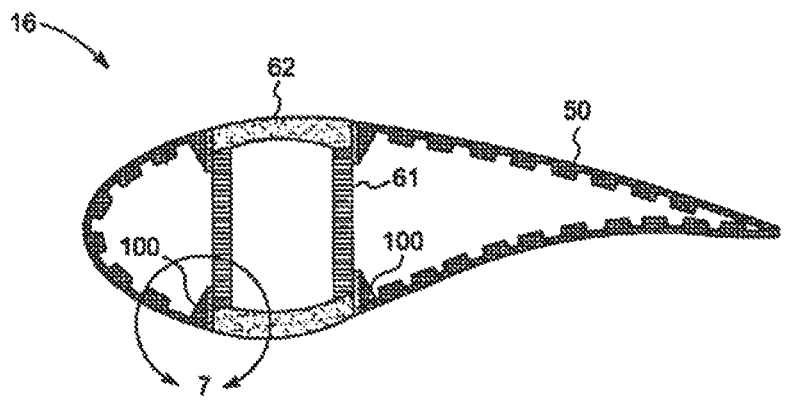
FIG. 6 is a cross-sectional view of a rotor blade comprising support flanges connecting an airfoil structure to a structural support member according to one or more embodiments shown or described herein; and, FIG. 7 is one of the support flanges illustrated in FIG. 6 according to one or more embodiments shown or described herein.

The structural support member 60 may thereby comprise any suitable shape or shapes to provide a main source of support for the overall rotor blade 16. In some embodiments, such as some of those discussed above, the structural support member 60 may comprise an I-beam configuration or a box-beam configuration in which at least one shear web 61 extends between two spar caps 62 as illustrated in FIG. 6. In even some embodiments, the structural support member 60 may comprise a D-beam configuration wherein the structural support member comprises a curved protrusion that comprises all or part of the leading edge 28 of the rotor blade 16. Furthermore, while specific configurations of the structural support member 60 have been presented herein, it should be appreciated that these are intended as non-limiting exemplary embodiments only and any other suitable alternative design for the structural support member may also be realized.

Referring now to FIGS. 2-5, the airfoil structure 50 is supported by the structural support member 60 and comprises an aerodynamic profile comprising the leading edge 28 opposite the trailing edge 30 and the pressure side 24 opposite the suction side 26. In some embodiments, the airfoil structure 50 may comprise both a shell portion 70 and at least one load-transferring exterior panel 80. In some embodiments, the airfoil structure 50 may simply comprise a plurality of load-transferring exterior panels 80, either in combination with or without an additional shell portion 70.

The shell portion 70, when present, may comprise any construction and material(s) that can combine with one or more of the load-transferring exterior panels 80 to form the aerodynamic profile. For example, in some embodiments, the shell portion 70 may be manufactured from a first shell half generally defining the pressure side 24 and a second shell half generally defining the suction side 26. The first and second shell halves may thereby be secured to one another at the leading and trailing edges 28 and 30.

The shell portion 70 may comprise any suitable material or materials. In some embodiments, one or more portions of the shell portion 70 may comprise a laminate composite material, such as a carbon fiber reinforced laminate composite or a glass fiber reinforced laminate composite. Alternatively or additionally, one or more portions of the shell portion 70 may comprise a layered construction such as comprising a core material formed of a lightweight material (e.g., wood or foam) or combinations thereof disposed between layers of laminate composite materials. In even some embodiments, at least a portion of shell portion 70 may comprise an elastomeric material such as polyuria or a flexible fabric material.

The load-transferring extension panels 80 comprise any panel that can capture the load of incoming wind and then substantially transfer that load to the structural support member 60 via an independent connection with the structural support member 60. As used herein, independent connection can refer to a separate connection for each of the load-transferring extension panels 80 and the structural support member 60. The independent connection facilitates the captured load (e.g., from incoming wind) being transferred directly to the structural support member with no or minimal load being transferred to an adjacent shell portion 70 or other load-transferring exterior panel 80.

By transferring the load to the structural support member via one or more load-transferring exterior panels 80 with independent connections, the airfoil structure 50 can be constructed without having to account for as much load carrying parameters. In turn, this may facilitate all or part of the airfoil structure comprising lighter weight material than would otherwise be required. For example, the load-transferring exterior panels 80 may comprise a different material from the shell portion 70, such as a lighter material, than the rest of the shell portion 70 making up the airfoil structure 50. Moreover, such lighter weight material may be less expensive and/or easier to install, thereby reducing costs of the overall blade. The load-transferring extension panels 80 may thereby comprise any suitable material that is independently connected to the structural support member 80 such as, for example, a polymeric material (e.g., thermoplastic material such as acrylonitrile butadiene styrene), a corrugated material, a fabric material, or the like, or combinations thereof.

As discussed above, the airfoil structure 50 may comprise either a plurality of load-transferring exterior panels 80, or a shell portion combined with one or more load-transferring exterior panels 80. Moreover, different portions of the airfoil structure 50 may comprise a single load-transferring exterior panel 80 or a plurality of load-transferring exterior panels 80.

Figure 4:
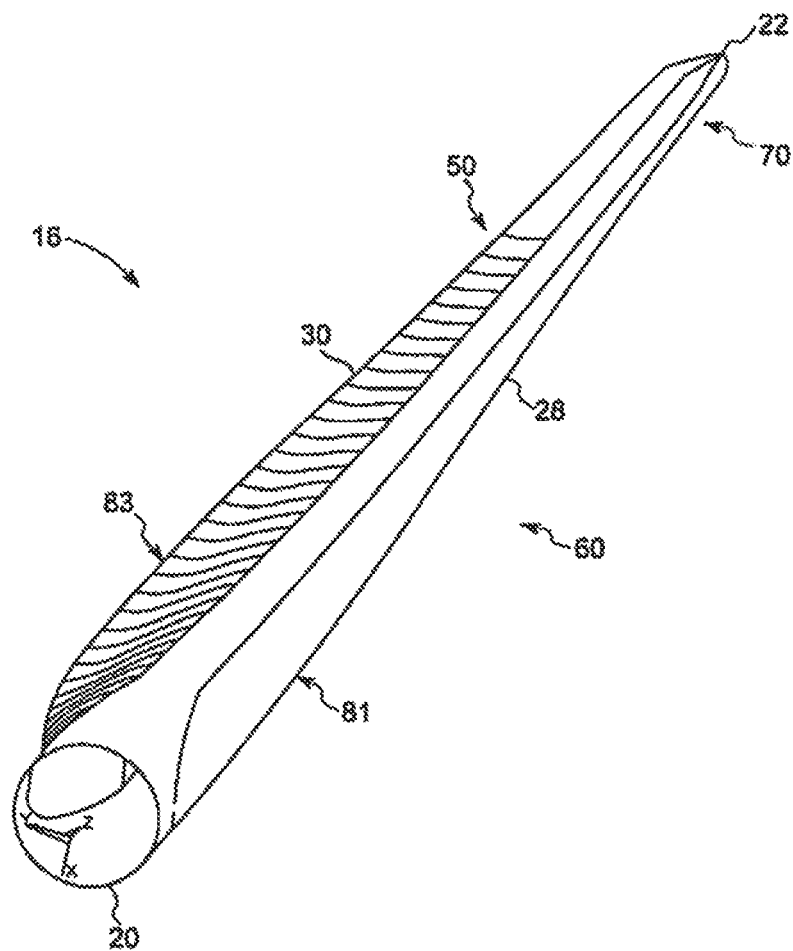
FIG. 4 is a perspective view of a rotor blade comprising a structural support member and an airfoil structure according to one or more embodiments shown or described herein.
Figure 5:
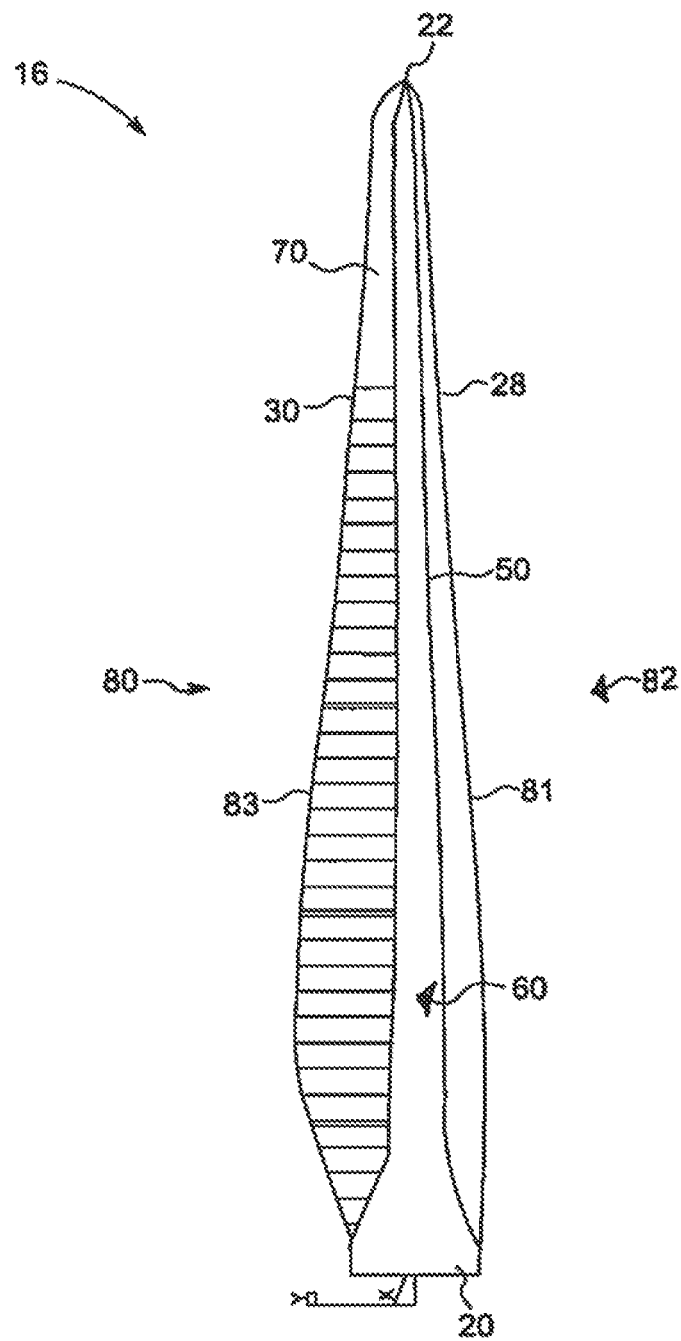
FIG. 5 is a top view of the rotor blade of FIG. 4 according to one or more embodiments shown or described herein.

As illustrated in FIGS. 3-5, for example, the airfoil structure 50 may comprise a shell portion that substantially comprises the tip end 22 as well as the pressure side 24 and the suction side 26 along the structural support member 60 of the overall aeroelastic profile. One or more of the load-transferring exterior panels 80 can then make up the rest of the airfoil structure 50.

For example, the trailing edge 30 can comprise at least one load-transferring exterior panel 83. In even some embodiments, the trailing edge 30 can comprise a plurality of load-transferring exterior panels 80 as illustrated. In such embodiments, each panel 83 of the plurality of load-transferring exterior panels 80 can be independently connected to the structural support member 60. The independent connections can ensure the load carried by each of the load-transferring exterior panels 80 is transferred to the structural support member 60.

In even some embodiments, the leading edge 28 can alternatively or additionally comprise at least one load-transferring exterior panel 81. For example, the leading edge 28 may comprise a single load-transferring exterior panel 80 as illustrated. In other embodiments, the leading edge 28 can comprise a plurality of load-transferring exterior panels 82. In such embodiments, each of the plurality of load-transferring exterior panels can be independently connected to the structural support member 60. The independent connections can ensure the load carried by each of the load-transferring exterior panels 82 is transferred to the structural support member 60.

Moreover, a plurality of portions of the airfoil structure 50 may comprise one or more load-transferring exterior panels 80. For example, in some embodiments, the leading edge 28 may comprise at least one load-transferring exterior panel 80 (e.g., a single continuous load-transferring exterior panel 80 or a plurality of load-transferring exterior panels 80). Moreover, the trailing edge 30 may also comprise at least one load-transferring exterior panel 80 (e.g., a single continuous load-transferring exterior panel 80 or a plurality of load-transferring exterior panels 80). The load-transferring exterior panels 80 may further be disposed for any length along the rotor blade 16, or even along a plurality of portions of the rotor blade 16, such as alternating with the shell portion 70.

In some particular embodiments, the number and placement of load-transferring exterior panels 80 may depend, in part, on the configuration of the structural support member 60. For example, where the structural support member 60 comprises a D-beam configuration (wherein the structural support member 60 comprises a curved protrusion that comprises all or part of the leading edge 28 of the rotor blade 16), the trailing edge 30 of the rotor blade 16 may comprise at least one load-transferring exterior panel 80. In some embodiments, where the structural support member 60 comprises a box-beam configuration, both the leading edge 28 and the trailing edge 30 of the rotor blade 16 may comprise at least one load-transferring exterior panel 80.

While specific locations and configurations of load-transferring exterior panels 80 have been disclosed herein, it should be appreciated that additional or alternative configurations can also be utilized.

In some embodiments, the load-transferring exterior panels 80 may be installed via an assembly method. For example, a method for assembly a rotor blade 16 for a wind turbine 10 may first comprise providing a structural support member 60. The method may further comprise connecting a plurality of load-transferring exterior panels 80 to the structural support member 80 to form an airfoil structure 50 supported by the structural support member 60. As discussed herein, the structural support member 60 can extend internal the airfoil structure 50 for at least a portion of the rotor blade span length. The plurality of load-transferring exterior panels 80 can combine to form an aerodynamic profile comprising the leading edge 28 opposite the trailing edge 30 and the pressure side 24 opposite the suction side 26. In some embodiments, the airfoil structure may further comprise a shell portion 70, wherein the shell portion 70 and the plurality of load-transferring exterior panels 80 combine to form the aerodynamic profile.

The load-transferring exterior panels 80 may be connected to the structural support member 60 through any suitable technique. For example, in some embodiments, each of the load-transferring exterior panels 80 may be independently connected to the structural support member 60 through bolts, pins, screws, adhesive, or the like or combinations thereof. In some embodiments, each of the load-transferring exterior panels 80 may be independently connected to the structural support member 60 via moveable connections such as slip joints. Moveable connections (e.g., slip joints) can refer to a connection between two components, wherein one component can still move relative to the other component as should be appreciated by those skilled in the art. Moveable connections used between the load-transferring exterior panels 80 may thereby facilitate some dynamic movement of the exterior aerodynamic profile relative the structural support member 60.

In some embodiments, adjacent load-transferring exterior panels 80 may be connected to one another via a moveable connection. Such embodiments may facilitate maintaining the overall aerodynamic profile of the airfoil structure 50 while still allowing the independent connections between each load-transferring exterior panel 80 and the structural support member 60 to transmit the captured load by the load-transferring exterior panel 80 to the structural support member 60 as opposed to the adjacent load-transferring exterior panel 80.

Figure 7:
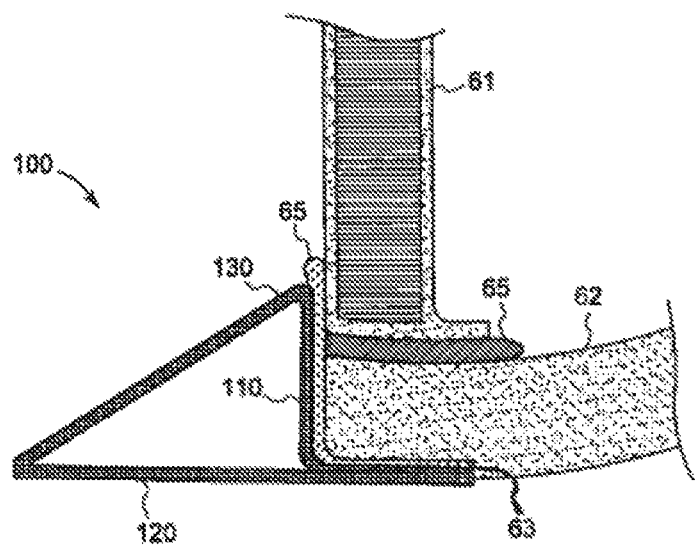

Referring now additionally to FIGS. 6 and 7, a plurality of support flanges 100 are illustrated for connecting and aligning the airfoil structure 50 (such as when the airfoil structure 50 comprises one or more load-transferring exterior panels 80) to the structural support member 60.

The support flange 100 can generally comprise a first wall 110 connected to the structural support member 60, a second wall 120 connected to the airfoil structure 50, and a connection wall 130 that extends between the first wall 110 and the second wall 120. The first wall 110 and second wall 120 may comprise any length or shape to facilitate a suitable connection to the adjacent component. The connection wall 130 may comprise any bridging support that extends between the first wall 110 and the second wall 120 to provide additional structural support by resisting, for example, bending moments from external loads.

The specific configuration of the first wall 110, second wall 120 and connection wall 130 can vary based at least in part on the structural support member 60 and the airfoil structure 50. For example, in some embodiments, the structural support member 60 may comprise at least one shear web 61 connected to at least one spar cap 62. Moreover, in some of these embodiments, the at least one shear web 61 may be connected to an end of the at least one spar cap 62 such as in box-beam configurations as illustrated in FIG. 6. In such embodiments, the first wall 110 of the support flange 100 may connect to both the at least one spar cap 62 and the at least one shear web 62 as illustrated. By extending the connection of the first wall 110 up onto the shear web 61, the support flange 100 may provide suitable connection, alignment and support between the structural support member 60 and the airfoil structure 50, despite the airfoil structure 50 having a potentially thinner, lighter and/or less supportive structure. In even some embodiments, the first wall 110 of the support flange 100 may connect to the at least one shear web 61 without connecting to the at least one spar cap 62. Such embodiments may provide alternative options such as when the configuration of the structural support member 60 or the airfoil structure 50 provide limited access to the at least one spar cap 62.

In even some embodiments, such as that illustrated in FIG. 7, the at least one spar cap 62 may comprise a recess 63 disposed on an outer surface that is opposite the at least one shear web 61. In such embodiments, the support flange 100 may extend at least partially into the recess 63 to help facilitate the connection. For example, part of the first wall 110, second wall 120 or both may extend into the recess 63 to help distribute the connection forces of the support flange 100.

Each of the walls 110, 120 and 130 may comprise any suitable material that can support and transmit the loads between the adjacent components. For example, in some embodiments, one or more of the first wall 110, second wall 120 and connection wall 130 may comprise a fiber composite material. In some embodiments, one or more of the first wall 110, second wall 120 and connection wall 130 may comprise a corrugated material.

Moreover, the first wall 110 and the second wall 120 may be connected to the structural support member 60 and the airfoil structure 50, respectively, via any suitable method. For example, an adhesive material 65 (e.g., methyl methacrylate) may be disposed between the first wall 110 and the structural support member 60 and/or between the second wall 120 and the airfoil structure 50. Alternatively or additionally, bolts, pins, screws or the like, or combinations thereof, may be utilized to secure one or more of the connections.

In even some embodiments, the second wall 120 may be integral with the airfoil structure 50. For example, the second wall 120 may be manufactured into the airfoil structure 50 such that they comprise one unitary piece. Such embodiments may, for example, be utilized when the airfoil structure 50 comprises a composite material or when the airfoil structure 50 comprises one or more load-transferring exterior panels 80.

As best illustrated in FIG. 6, in some embodiments, the rotor blade 16 may comprise a plurality of support flanges 100. For example, the rotor blade 16 may comprise at least one support flange 100 disposed on each side of the structural support member 60 and on both the pressure side 24 and the suction side 26 as illustrated. Moreover, the rotor blade 16 may comprise a plurality of support flanges 16 along the span 32 of the rotor blade 16, such as support flange 100 for each load-transferring exterior panel 80 when a plurality are distributed along the span 32.

While the support flange 100 may particularly be utilized in embodiments where the airfoil structure 50 comprises one or more load-transferring exterior panels 80, the support flange 100 may additionally or alternatively be utilized in a variety of other rotor blade configurations. For example, in some embodiments, the airfoil structure 50 may comprise a plurality of modular shell components and the support flange 100 may connect at least one of the plurality of modular shell components to the structural support member 60. In other embodiments, the airfoil structure 50 may comprise a single a plurality of sections comprising fiber composite materials, corrugated materials, or any other suitable material.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade for a wind turbine, the rotor blade comprising:
   a structural support member that extends for at least a portion of a rotor blade span length, wherein the structural support member comprises at least one shear web, and at least one spar cap connected to the at least one shear web; and an airfoil structure supported by the structural support member, the airfoil structure comprising a shell portion and at least one load-transferring exterior panel, wherein the shell portion and the at least one load-transferring exterior panel combine to form an aerodynamic profile comprising a leading edge opposite a trailing edge and a pressure side opposite a suction side, and wherein the shell portion and the at least one load-transferring exterior panel are connected to the at least one shear web of the structural support member to transfer captured load from incoming wind directly to the structural support member with minimal load transferred to at least one of adjacent shell portions and other panels of the at least one load-transferring exterior panel, wherein a support flange connects and aligns the airfoil structure to the structural support member, where the support flange comprises a first wall connected to the structural support member, a second wall connected to the airfoil structure, and a connection wall extending between the first wall and the second wall.

2. The rotor blade of claim 1, wherein the trailing edge comprises the at least one load-transferring exterior panel.

3. The rotor blade of claim 2, wherein the trailing edge comprises a plurality of the load-transferring exterior panels, wherein each of the plurality of load-transferring exterior panels are connected to the structural support member.

4. The rotor blade of claim 2, wherein the structural support member comprises a D-beam configuration, and a curved protrusion that comprises at least part of the leading edge or the rotor blade.

5. The rotor blade of claim 1, wherein the leading edge comprises the at least one load-transferring exterior panel.

6. The rotor blade of claim 5, wherein the trailing edge also comprises at least one load-transferring exterior panel.

7. The rotor blade of claim 6, wherein the structural support member comprises a box-beam configuration.

8. The rotor blade of claim 1, wherein the at least one load-transferring exterior panel comprises a thermoplastic material.

9. The rotor blade of claim 1, wherein a tip portion of the aerodynamic profile comprises the shell portion.

10. The rotor blade of claim 1, wherein the airfoil structure comprises a plurality of load-transferring exterior panels, wherein each of the plurality of load-transferring exterior panels is connected to the structural support member.

11. A rotor blade for a wind turbine, the rotor blade comprising:

a structural support member that extends for at least a portion of a rotor blade span length, wherein the structural support member comprises at least one shear web, and at least one spar cap connected to the at least one shear web; and an airfoil structure supported by the structural support member, the airfoil structure comprising a plurality of load-transferring exterior panels, wherein the plurality of load-transferring exterior panels combines to form an aerodynamic profile comprising a leading edge opposite a trailing edge and a pressure side opposite a suction side, and wherein each of the plurality of load-transferring exterior panels is connected to the at least one shear web of the structural support member to transfer captured load from incoming wind directly to the structural support member with minimal load transferred to at least one of adjacent shell portions and other panels of the at least one load-transferring exterior panel, wherein a support flange connects and aligns the airfoil structure to the structural support member, where the support flange comprises a first wall connected to the structural support member, a second wall connected to the airfoil structure, and a connection wall extending between the first wall and the second wall.

12. The rotor blade of claim 11, wherein the leading edge comprises a single load-transferring exterior panel.

13. The rotor blade of claim 12, wherein the trailing edge comprises a plurality of load-transferring exterior panels.

14. The rotor blade of claim 13, wherein the structural support member comprises a box-beam configuration.

15. The rotor blade of claim 11, wherein the at least one spar cap comprises a recess disposed on an outer surface opposite the at least one shear web and wherein the support flange at least partially extends into the recess to facilitate connection therebetween.

16. The rotor blade of claim 15, wherein at least a part of one of the first wall or the second wall extend into the recess to help distribute connection forces on the support flange.

17. The rotor blade of claim 15, wherein at least one of the first wall and the second wall are connected to the structural support member and the airfoil structure via adhesive.

18. A method for assembling a rotor blade for a wind turbine, the method comprising:

providing a structural support member, wherein the structural support member comprises at least one shear web, and at least one spar cap connected to the at least one shear web; and connecting a plurality of load-transferring exterior panels to the structural support member to form an airfoil structure supported by the structural support member, wherein the structural support member extends internal the airfoil structure for at least a portion of a rotor blade span length, wherein each of the plurality of load-transferring exterior panels are connected to the at least one shear web of the structural support member, and wherein the plurality of load-transferring exterior panels combines to form an aerodynamic profile comprising a leading edge opposite a trailing edge and a pressure side opposite a suction side to transfer captured load from incoming wind directly to the structural support member with minimal load transferred to at least one of adjacent shell portions and other panels of the at least one load-transferring exterior panel wherein a support flange connects and aligns the airfoil structure to the structural support member, where the support flange comprises a first wall connected to the structural support member, a second wall connected to the airfoil structure, and a connection wall extending between the first wall and the second wall.

19. The method of claim 18, wherein the airfoil structure further comprises a shell portion, and wherein the shell portion and the plurality of load-transferring exterior panels combine to form the aerodynamic profile.

\* \* \* \* \*